KEY PULSING B OPERATOR POSITION CIRCUIT

Filed June 29, 1948 4 Sheets-Sheet 1

INVENTORS H. E. NOWECK
T. D. ROBB

BY R. O. Covell

ATTORNEY

KEY PULSING B OPERATOR POSITION CIRCUIT

Filed June 29, 1948 4 Sheets-Sheet 2

INVENTORS H. E. NOWECK
T. D. ROBB
BY R. O. Covell
ATTORNEY

KEY PULSING B OPERATOR POSITION CIRCUIT

Filed June 29, 1948 4 Sheets-Sheet 3

INVENTORS H. E. NOWECK
T. D. ROBB
BY
R. O. Covell
ATTORNEY

KEY PULSING B OPERATOR POSITION CIRCUIT

Filed June 29, 1948 4 Sheets-Sheet 4

INVENTORS H. E. NOWECK
T. D. ROBB
BY
R. O. Covell
ATTORNEY

Patented Sept. 18, 1951

2,568,164

UNITED STATES PATENT OFFICE 2,568,164

KEY PULSING B OPERATOR POSITION CIRCUIT

Herman E. Noweck, Mountain Lakes, and Theodore D. Robb, Ridgewood, N. J., assignors to Bell Telephone Laboratories, Incorporated, New York, N. Y., a corporation of New York Application June 29, 1948, Serial No. 35,846

3 Claims. (Cl. 179—27)

This invention relates to telephone systems and particularly to systems comprising operator positions for completing calls to both manual and automatic offices.

Objects of the invention are the provision of improved operator position equipment for use in extending calls incoming from other operator positions to both manual and automatic offices and an increase in the efficiency in the handling of such calls.

This invention is an improvement in B operator position equipment which is arranged for automatic individual connection to straightforward trunks incoming from another operator position, for automatically transmitting an order tone signal over the connected incoming trunk to indicate that the operator is waiting to receive the called office name or code and for manually connecting the incoming trunk to a trunk outgoing to the called office, whereby the call may be extended over a straightforward trunk to an operator in a called manual office or be extended to an automatic office over a trunk arranged for key pulsing. To this end, the B operator position is provided with a numerical key set for transmitting, over a connected trunk outgoing to the called office, signal impulses identifying the digits of the called subscriber's number, and a key the operation of which effects the association of the key set with the incoming trunk and also the transmission of another and different order tone signal over the incoming trunk to indicate that the operator is waiting to receive the called subscriber's number. A feature of the invention is the provision of means in the incoming trunk circuit for disconnecting the operator's telephone set and position equipment immediately upon extension of the connection to an outgoing trunk for completion by the straightforward method of operation and the provision of means for maintaining the connection between the incoming trunk and B operator equipment after connection of the incoming trunk to an outgoing key pulsing trunk until the transmission of digit signals has been completed.

The drawing shows schematically a telephone system comprising trunk and operator position equipment arranged in accordance with this invention. Referring to the drawing:

Fig. 1 shows a calling subscriber's station X and line L1 in a local office and a trunk 10 between the local office and a toll office; and shows in the toll office, an incoming trunk circuit 11, an A operator's cord CD, position circuit OP and telephone set, and a switching trunk T1 which is jack-ended at the A operator position and which is plug-ended at a B operator position;

Fig. 2 shows the B operator's telephone and grouping key circuits and a position release circuit. Fig. 2 further shows one of a group of jack-ended trunk circuits each associated with a trunk outgoing to a manual local office and one of a group of jack-ended trunk circuits each associated with a trunk outgoing to a local dial office. Fig. 2 further shows in a step-by-step local dial office, an incoming trunk circuit, an incoming selector, a connector, and a called subscriber's line L2 and station Y;

Fig. 5 shows the relative position in which Figs. 1 to 4 are to be placed to form an operative arrangement.

Figure 1:
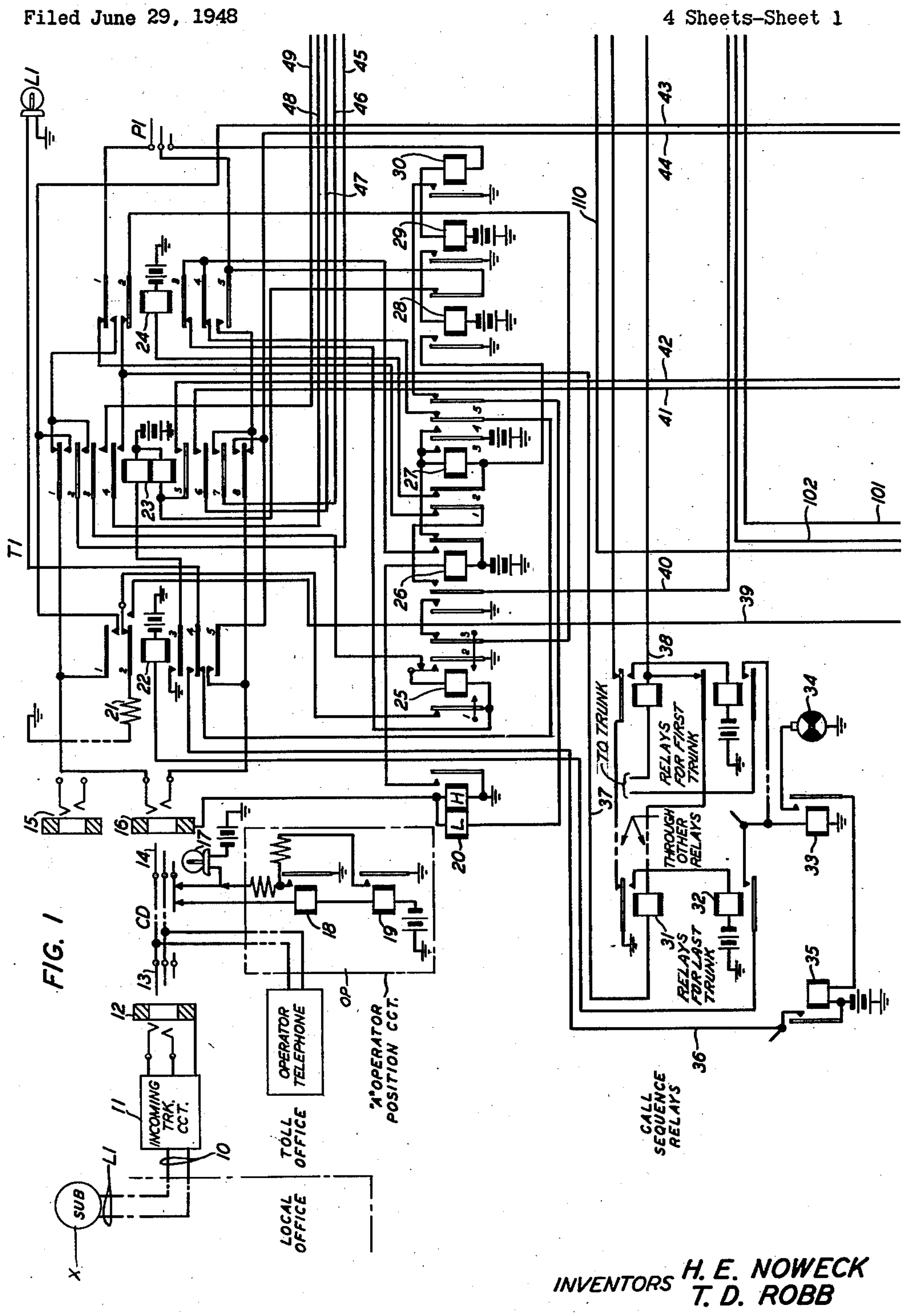
Figure 2:
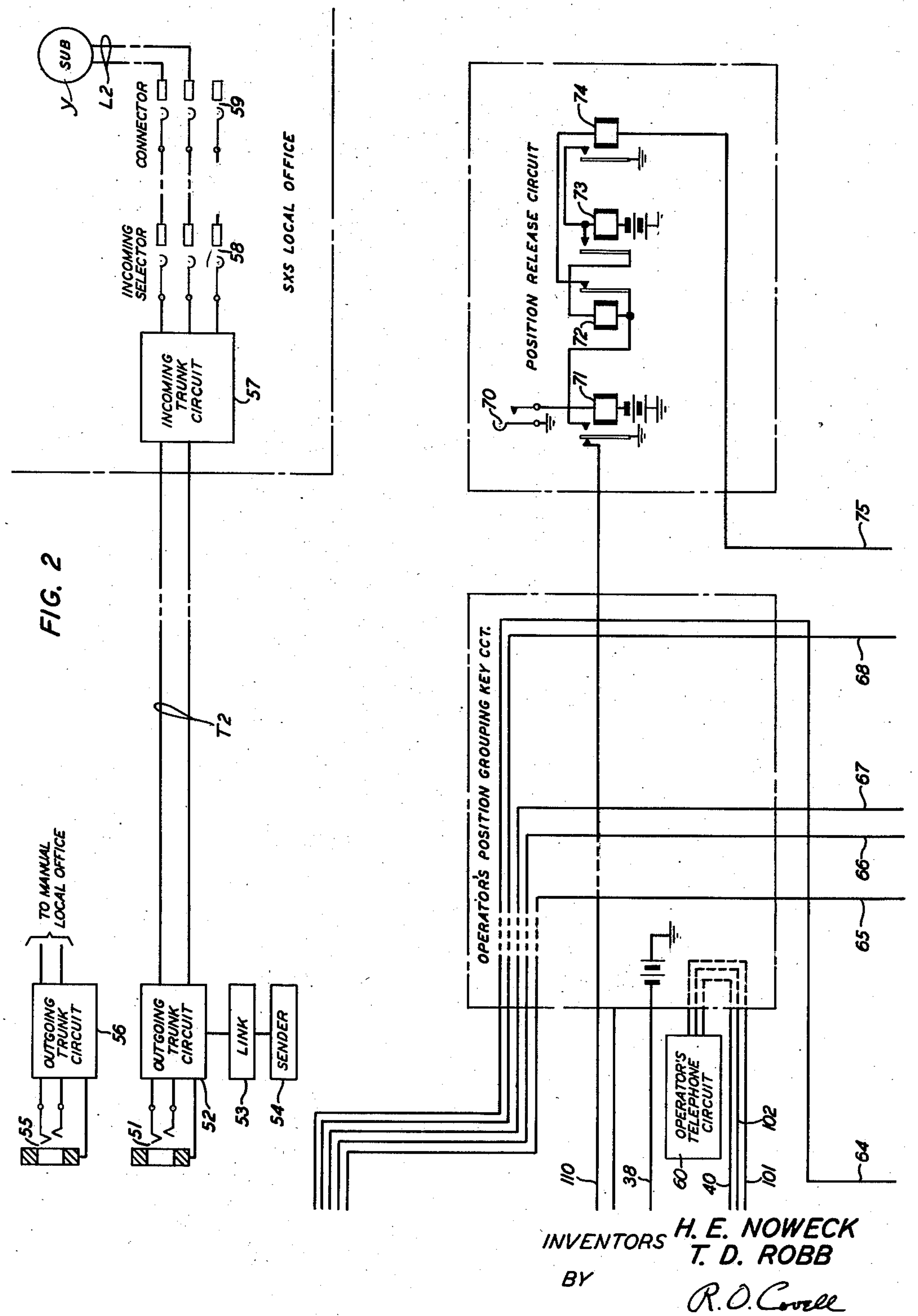
Figure 3:
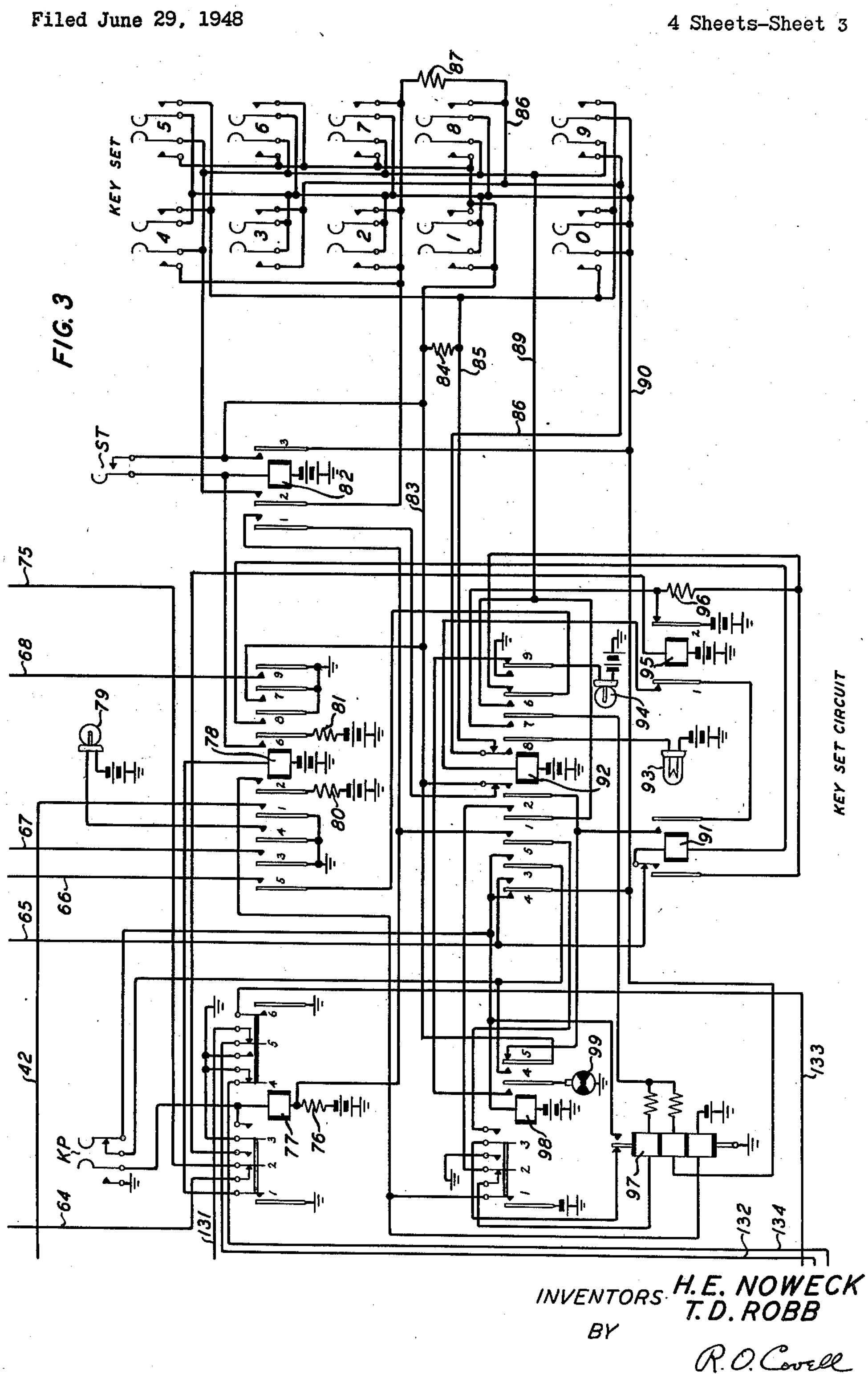
Fig. 3 shows the B operator's key set circuit.
Figure 4:
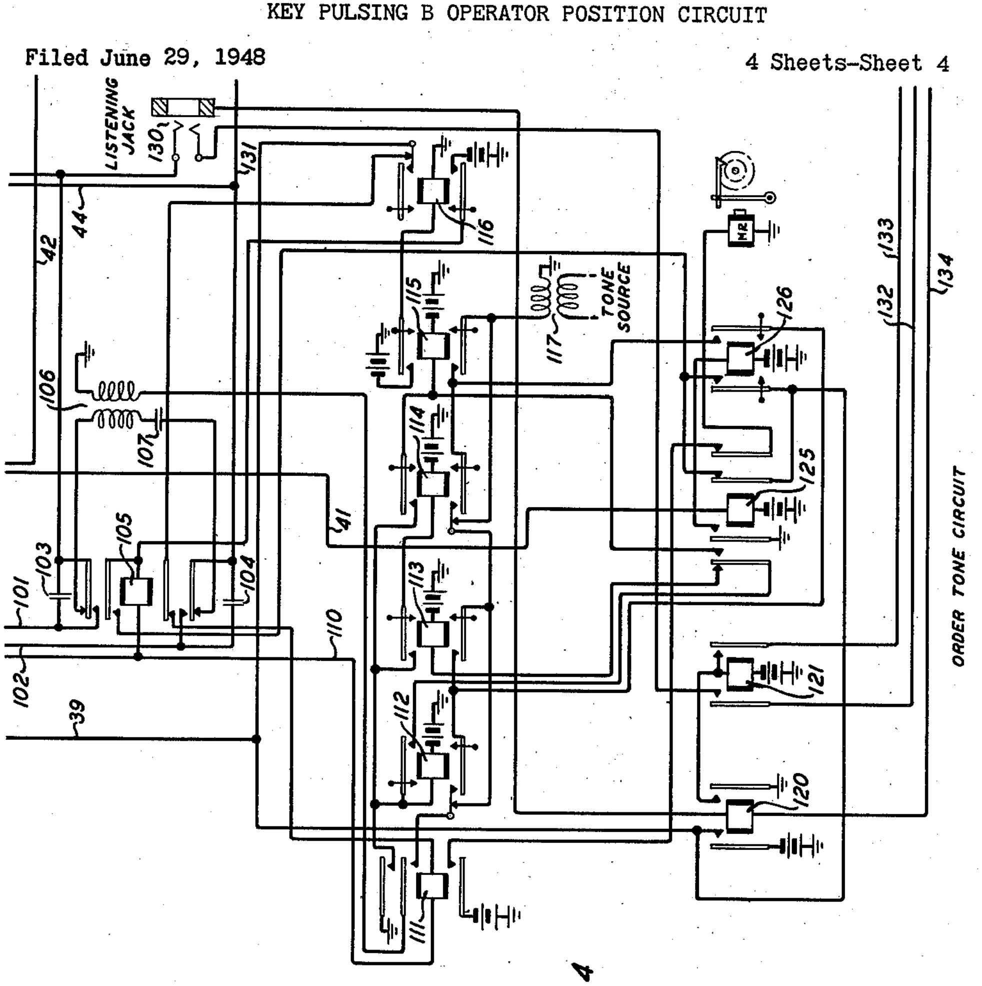
Fig. 4 shows the B operator's order tone circuit.
Figure 5:
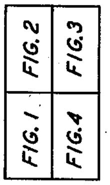

The local office serving the calling station X may be either a manual or dial office of known type arranged to complete local calls and to connect calling lines to trunks terminating at A operator positions of a toll office. The toll A operator cord, position and telephone circuits may be similar to those disclosed in Patent 1,675,956 granted July 3, 1928 to L. F. Porter.

The trunk circuit T1, which is a three-conductor trunk jack-ended at A operator positions of the toll board and plug-ended at a switching or B position of the same toll board, is shown in detail; and so also are the order tone, key set and position release circuits. The trunk circuit T1 and B operator position are arranged for automatic listening, call sequence relays being provided for connecting calling incoming trunks such as T1 to the operator's telephone and order tone circuits, one trunk at a time. Reference may be had to Patent 1,632,051 granted to W. Whitney, June 14, 1927 for further disclosure of a B operator's position and trunks arranged for automatic listening and order tone transmission. Reference may also be had to Patent 1,767,929 granted to H. B. Johnson, June 24, 1930 for disclosure of an arrangement for grouping a plurality of operators' positions under control of one operator.

The trunk associated with outgoing trunk circuit 56 is used as a straightforward trunk and terminates at a B operator position in a local manual office. Reference may be had to Patent 1,751,207 granted March 18, 1930 to H. B. Johnson for disclosure of a toll switching trunk terminating in a manual local office for straightforward operation.

The trunk circuit 52, link circuit 53 and key pulsing sender circuit 54 are of known type and may be similar to the trunk, link and sender circuits disclosed in Patent 1,916,760 granted July 4, 1933 to I. H. Henry. The associated trunk T2 terminates in incoming trunk circuit 57 in a step-by-step local office which comprises incoming selector and connector switches 58 and 59 for completing connection with a called line under the control of the sender 54 in the manner set forth in said patent to I. H. Henry.

Assume now that a call has been initiated at a subscriber's station X in a local office, and that the subscriber's line L1 is connected in the local office to an outgoing trunk terminating in incoming trunk circuit 11 in a toll office, that the incoming trunk circuit is jack-ended at a toll board, and an operator at the toll board answers the call by connecting the plug 13 of a cord to jack 12. The operator receives from the calling subscriber the office name and number and the number of the subscriber's station in that office with which the calling subscriber desires connection. If the answering toll operator has direct access to trunks terminating in the called office, the call may be completed by connecting the plug 14 to the jack 15 of an idle one of these trunks. If, however, the answering toll operator does not have direct access to the called office, the plug 14 is connected to the jack 16 of an office switching trunk T1 which terminates at a B operator position of the toll board, at which position the plug-ended switching trunk T1 may be connected to another switching trunk that terminates in the called office.

When plug 14 is inserted in jack 16, a circuit is closed, through the sleeve conductors of the plug and jack, for energizing the right winding of sleeve relay 20 of the associated trunk circuit T1. The operation of relay 20 closes a circuit for operating relay 26. The operation of relay 26 lights the trunk lamp L1; closes a connection from ground through its left outer front contact, a back contact of relay 25, and a back contact of relay 24, to one end of the winding of the call sequence relay 31; and connects the tip of the plug P1 of trunk circuit T1 to the busy test conductor 40 leading to the operator's telephone circuit 60. As soon thereafter as the call sequence relays (which are shown only in part) are in condition for connecting trunk circuit T1 to the operator telephone circuit 60, battery is connected in the operator position circuit through conductor 38 to the other side of the winding of sequence relay 31, thereby effecting the operation of relays 31 and 32 in succession. The operation of relay 32 connects the winding of relay 22 of trunk circuit T1 in series with the winding of the common sequence relay 33, both of relays 22 and 33 being thereby operatively energized. The operation of relay 22 closes a circuit for operating relay 23 and closes a connection between the answering operator's telephone and the B operator's order tone circuit; which connection includes the tip and ring conductors of plug 14 and jack 16, front contacts of relay 22 of trunk circuit T1, conductors 43 and 44, back contacts of relay 105 of the order tone circuit, and one winding of induction coil 106 in series with condenser 107. Relay 33 connects the winding of relay 35 to interrupter 34 to alternately operate and release relay 35; and, with relay 22 operated, the trunk lamp L1 is flashed under the control of relay 35, indicating that trunk circuit T1 is associated with the operator's telephone 60. With relays 26 and 22 operated, a circuit is closed from battery through the right front contact of relay 26, a back contact of relay 24, a back contact of relay 25, inner upper front contact of relay 22, conductor 39, back contact of relay 116 of the order tone circuit, a back contact of relay 105, winding of relay 111, conductor 110, through the grouping key circuit, to ground at the back contact of relay 71 of the position release circuit. Relay 111 operates thereby closing a circuit for operating relay 112; relay 112 closes a circuit for operating relay 113; relay 113 closes a circuit for operating relay 114; relay 114 closes a circuit for operating relay 115; relay 115 closes a circuit for operating relay 116; relay 116 opens the operating circuit of relay 111 and closes a circuit for operating relay 105. Each of relays 112, 113, 114, 115 and 116 is a slow-to-release relay; and, during the operation of these relays in succession, the high tone source 117 is connected to the right winding of induction coil 106 to transmit three impulses of tone through the above-traced connection between the left winding of coil 106 and the A operator. The first pulse begins when relay 111 operates and ends when relay 112 operates; the second pulse begins when relay 113 operates and ends when relay 114 operates; and the third pulse begins when relay 115 operates and ends when relay 105 operates. The B operator also hears the tone impulses since conductors 43 and 44 are at this time connected through condensers 103 and 104 and conductors 101 and 102 to the B operator's telephone circuit 60. The operation of relay 105 not only terminates the third tone pulse but also connects conductors 43 and 44 directly to conductors 101 and 102 so that the B operator can receive the office code from the A operator. The operation of relay 105 opens the operating circuit of relay 111 thereby causing the successive release of relays 111 to 116, inclusive. Relay 105 is held operated after relay 116 releases by a locking circuit, which includes conductor 110, winding and inner upper front contact of relay 105, inner right back contact of relay 125 and conductor 39, to battery in trunk circuit T1 as hereinbefore traced.

If the call is one to be completed over an outgoing straightforward trunk to another manual office, the B operator inserts plug P1 in a jack 55 associated with outgoing trunk circuit 56. The windings of relays 29 and 30 in series are thereby connected through the sleeve conductors of plug P1 and jack 55 to the sleeve conductor of the outgoing trunk circuit 56 in which this conductor is connected through the high resistance winding of a sleeve relay to ground and is also connected through the low resistance winding of the sleeve relay to ground under the control of the answering supervisory relay, neither the sleeve nor the answering supervisory relays of trunk circuit 56 being shown. Relay 29 operates but relay 30 is marginal and does not operate until the low resistance winding of the sleeve relay in trunk circuit 56 is connected to ground. The operation of relay 29 closes a circuit for operating relay 28. The operation of relay 28 disconnects the lower winding of relay 23 from the ring conductor of plug P1 and closes a circuit for operating relay 24. The operation of relay 24 disconnects ground from conductor 37, disconnects the tip of plug P1 from the busy test conductor 40 of the operator's telephone circuit and connects the tip and ring conductors of plug P1 to the tip and ring conductors of jack 16. The disconnection of ground from conductor 37 causes the release of call sequence relays 31 and 32 and thereby effects release of relay 22 of trunk circuit T1. The release of relay 22 effects the release of relay 23, the operation of relay 23 being without useful function on a call which is not completed over a trunk arranged for key pulsing. With relay 22 normal, the talking conductors of jack 16 are connected through the tip and ring conductors of plug P1 and jack 55 to trunk circuit 56. The A operator receives order tone from the called manual office, in the manner described in the aforementioned patents to W. Whitney and H. B. Johnson, and passes the called number to an operator in the called office, who thereupon completes the connection to the called line. When the call is answered, the connection of ground to the aforementiond low resistance winding of the sleeve relay of trunk circuit 56 causes the operation of relay 30 of trunk circuit T1. The operation of relay 30 connects ground to the low resistance winding of relay 20 thereby lighting the supervisory lamp 17 associated with plug 14. When relay 30 releases due to disconnection of ground from the low resistance winding of the sleeve relay of trunk circuit 58, ground is likewise disconnected from the low resistance winding of relay 20 thereby extinguishing lamp 17.

When the A operator disconnects plug 14 from jack 16, relays 20 and 26 release in succession. With relay 28 operated, the release of relay 26 closes a circuit for operating relay 27; and relay 27 locks independent of relay 26 so that insertion of a plug in jack 16 is ineffective to release relay 27 as long as relay 28 remains operated. The operation of relay 27 causes the release of relay 24, lights the trunk lamp L1 as a disconnect signal, and prevents the transmission of a supervisory signal to any cord which may be connected to jack 16 before plug P1 is disconnected from jack 55. The release of relay 24 opens the talking connection between jack 16 and trunk circuit 56. If a plug is again connected to jack 16 before plug P1 is disconnected from jack 55, relays 20 and 26 are operated and the trunk circuit T1 is connected to the B operator's telephone circuit as hereinbefore described; but it is necessary for the plug P1 to be disconnected from jack 55 in every case to enable the extension of another call. When plug P1 is removed from jack 55, relays 29, 30 and 27 release; and, with no plug in jack 16, the lamp L1 is extinguished. In case the plug P1 is disconnected from jack 55 before the plug 14 is disconnected from jack 16, relays 29, 30, 28 and 24 are released, the lamp L1 is lighted, ground is again connected to conductor 37 and the call sequence relays function to associate trunk circuit T1 with the B operator's telephone and order tone circuits.

Assume next that the office code received by the B operator is one which requires completion over a trunk arranged for key pulsing. The B operator thereupon momentarily operates the KP key of the position key set circuit and then inserts plug P1 in a jack 51 associated with a trunk circuit 52. The operation of the KP key closes a circuit for operating relay 77; and relay 77 locks independent of the key. The operation of relay 77 closes a circuit for operating relay 78, opens the connection between conductors 131 and 132 of the order tone circuit, connects ground to conductors 132 and 133, disconnects ground from conductor 134, opens the connection between conductor 75 of the position release circuit and conductor 64 of the grouping key circuit and connects conductor 75 to the winding of relay 95 of the key set circuit. The operation of relay 78 lights lamp 79 to indicate that the key set circuit is associated with the trunk circuit; closes a circuit through resistor 80 for energizing the lower biasing winding of relay 97; connects ground to conductor 67, thence through the grouping key circuit, conductor 47, a front contact of relay 23 and conductor 41 to operate relay 125 of the order tone circuit; connects resistor 81 in parallel with the winding of relay 82; connects ground to conductor 42 to hold relay 23 of trunk circuit T1 operated; connects ground to conductor 68, thence through the grouping key circuit, conductor 48, a front contact of relay 23 and conductor 37 to hold the call sequence relay 31 operated; and connects ground to conductor 83.

The insertion of plug P1 in jack 51 causes the operation of relays 29, 28 and 24, relay 31 being held operated, after relay 24 operates, under the control of relay 78 of the key set circuit. The trunk circuit 52 thereupon functions to effect the operation of a link circuit 53 to associate an idle sender 54 with trunk circuit 52. Reference may be had to Patent 1,916,760 granted July 4, 1933 to I. H. Henry for a complete description of the operation of trunk, link and sender circuits arranged for cooperation with an operator's key set circuit. When an idle sender 54 is attached to trunk circuit 52, a relay in the sender is operated, as described in the aforementioned Henry patent, in a circuit from battery at the right back contact of relay 95 of the key set circuit, through resistor 96, a back contact of relay 92, a front contact of relay 78, conductor 66, through the grouping key circuit, conductor 46, front contacts of relays 23 and 24, ring conductors of plug P1 and jack 51, through the key pulsing ring conductor of the trunk and link circuits 52 and 53 to the sender circuit 54. In the sender, battery is now connected to the key pulsing tip conductor thence through the link and trunk circuits 53 and 52, tip conductors of jack 51 and plug P1, front contacts of relays 24 and 23, conductor 45, through the grouping key circuit, conductor 65, continuity contact and winding of relay 91, to ground at a front contact of relay 78. Relay 91 operates, closes a locking circuit under the sole control of relays 78 and 95, and closes a circuit which includes back contacts of relays 95 and 98 for operating relay 92. The operation of relay 92 extends the tip and ring key pulsing conductors 65 and 66 to conductors 89 and 90 of the numerical key set; connects battery through resistance lamp 93 to conductor 86; connects battery at the right back contact of relay 95 to the upper and middle windings of relay 97, connects conductor 89 to the other end of the upper winding of relay 97, and lights the sender-attached-signal lamp 94 to indicate that keying of the called number may be started.

The above-mentioned operation of relay 125 of the order tone circuit closes a circuit for operating relay 126; opens the holding circuit of relay 105, thereby effecting the release of relay 105; and rearranges the sequence of operation of the order tone relays so as to skip the operation of relays 113 and 114. The release of relay 105 recloses the circuit for operating relay 111. A first impulse of tone is thereupon started when relay 111 operates and ended when relay 112 operates; and a second impulse is started when relay 115 operates and ended when relay 116 operates. Relay 116 again closes the circuit for operating relay 105 and relay 105 locks under the control of relay 126. Responsive to the two tone impulses, the A operator passes the called station number to the B operator, and as soon as the sender-attached lamp 94 is lighted the B operator depresses the corresponding keys of the numerical key set, one at a time. The key set impulses thereby transmitted to the sender 54 effect the registration of the called number. The start key ST is operated after the last numerical key has been depressed, thereby operating relay 82 to transmit impulses to indicate that keying has been completed. During the transmission of digit impulses, the upper and middle windings of relay 97 are energized but relay 97 does not operate due to the energization of its biasing winding. When all the digits have been registered in the sender, battery of a higher voltage is connected in the sender to both of the key pulsing conductors so as to effect the operation of relay 97. Relay 97 closes a circuit for operating relay 98. Relay 98 locks under the control of relay 78, closes a short circuit across the biasing winding of relay 97, so that relay 97 will be held operated by only one of its operating windings, and then disconnects battery from and connects ground to the key pulsing ring conductor 66 as a start ringing signal to the sender. The sender thereupon disconnects battery from both of the key pulsing conductors, releasing relay 97. The release of relay 97 connects ground through its left contact, a front contact of relay 98, a front contact of relay 92 to resistor 76; thereby short circuiting and causing the release of relay 77. The release of relay 77 effects the release of relays 78, 91, 92 and 98 thereby restoring the key set circuit to normal, including the disconnection of ground from conductors 42, 67, 68 and 133 and the reconnection of ground to conductor 134. The disconnection of ground from conductor 67 effects the release of relays 125 and 126 of the order tone circuit. The disconnection of ground from conductor 42 opens the locking circuit of relay 23; and the disconnection of ground from conductor 68 causes the release of call sequence relays 31 and 32 followed by the release of relays 22, 33 and 23.

In case of necessity, for instance if the call sequence relays fail to operate, the B operator may connect plug P1 to the emergency listening jack 130 of the order tone circuit whereupon relay 29 of the trunk circuit and relay 120 of the order tone circuit are operated in series. Being marginal, relay 30 does not operate in series with relay 120. The operation of relay 29 causes the operation of relays 28 and 24 in succession; and the operation of relay 120 closes a circuit for operating relay 121 and connects battery directly to conductor 39 to cause the order tone circuit to operate as hereinbefore described. After receiving the office code, the plug P1 is removed from jack 130 and the call is extended over a straightforward trunk or a key pulsing trunk. If the call is extended over a key pulsing trunk, the operation of relay 77 when the KP key is operated causes the release of relays 29 and 120. The release of relay 29 causes the release of relay 28. Relay 121 is held operated over conductor 133 to ground at a front contact of relay 77 and relay 23 is operated by the energization of its lower winding in a circuit which includes the back contact of relay 28, ring conductor of plug P1 and jack 130, a front contact of relay 121, conductor 132 and a front contact of relay 77.

If it is found that call cannot be completed after it has been extended to a switching trunk T1 and this trunk has been connected to the B operator telephone set 60, the B operator may release the trunk circuit T1 by operation of the position release key 70. The operation of key 70, which must be maintained until release has been effected, causes the operation of relay 71. Relay 71 disconnects ground from conductor 110 to release relay 111 of the order tone circuit, if operated. If the KP key has not been operated relay 71 closes a circuit for operating relay 74 of the position release circuit and relay 25 of the trunk circuit T1 in series. This circuit is traced from ground at the front contact of relay 71, through the back contact of relay 72, winding of relay 74, conductor 75, back contact of relay 77, conductor 64, through the grouping key circuit, conductor 49, a front contact of relay 23 of trunk circuit T1, continuity contact and winding of relay 25, a back contact of relay 24, and through a front contact of relay 26 to battery. Relay 74 closes a circuit for operating relay 73. Relay 25 locks to ground at its front contact, disconnects battery from conductor 39, and disconnects ground from conductor 37 thereby causing the release of the call sequence relays 31 and 32 in succession. The release of relay 32 causes the release of relays 22 and 23 thereby terminating the flashing of lamp L1 and closing a circuit for lighting lamp L1 steadily. When relay 25 operates, relay 74 releases due to the opening of the series circuit through the windings of these relays. When relay 74 releases, relay 73 is held operated and relay 72 operates in a series circuit, which circuit is maintained until relay 71 releases upon release of key 70.

If an error is made in keying the called number and discovered before the key set circuit is released by the sender, the key set is released by removing the plug P1 from the key pulsing trunk jack and then operating the position release key 70. In this case the operation of relay 71 closes a circuit through the winding of relay 74, conductor 75, a front contact of relay 77 and the winding of relay 95 in the key set circuit. The operation of relay 95 causes the successive release of relays 91 and 92, but relays 77 and 78 remain operated. When relay 71 releases, relay 72 operates in series with the windings of relays 95 and 74. The operation of relay 72 causes its own release and the release of relay 74 followed by the release of relay 73. The B operator may now plug into a key pulsing trunk jack and keying may start when the sender attached signal lights as hereinbefore described.

What is claimed is:

1. In a telephone system, an operator position comprising a telephone set and a key pulsing key set for transmitting digit signals, incoming trunks terminating at said position, outgoing trunks arranged for straightforward operation, outgoing trunks arranged for key pulsing, means for automatically connecting said incoming trunks one at a time to said position telephone set, means responsive to the connection of an incoming trunk to said telephone set for transmitting a plurality of order tone impulses over said incoming trunk, manually operated means for connecting said incoming trunk to any one of said outgoing trunks, means comprising a key for connecting said key set with said incoming trunk, relay means operated upon connection of said key set to said incoming trunk for transmitting over said incoming trunk a different plurality of order tone impulses, means for disconnecting said incoming trunk from said telephone set as soon as said incoming trunk is connected to an outgoing trunk arranged for straightforward operation, relay means rendered effective by the operation of said key for maintaining the connection of an incoming trunk to said telephone set after said incoming trunk is connected to an outgoing trunk circuit arranged for key pulsing, means comprising said key set for transmitting digit signals over an outgoing key pulsing trunk to which said incoming trunk is connected, and means effective after the transmission of said digit signals to disconnect said telephone set and key set from said incoming trunk.

2. In a telephone system an operator position comprising a telephone set and a key set, one key for each different signal to be transmitted, incoming trunks terminating at said position, outgoing trunks arranged for key pulsing, means for connecting a calling incoming trunk to said telephone set, means responsive to the connection of an incoming trunk to said telephone set for transmitting a tone signal over said incoming trunk, means comprising a key for connecting said key set with said incoming trunk, and means effective responsive to the association of said key set with said incoming trunk for transmitting a different tone signal over said incoming trunk.

3. In a telephone system an operator position comprising a telephone set and a key set, one key for each different signal to be transmitted, incoming trunks terminating at said position, outgoing trunks arranged for key pulsing, means for connecting a calling incoming trunk to said telephone set, means responsive to the connection of an incoming trunk to said telephone set for transmitting a tone signal over said incoming trunk, means comprising a key for connecting said key set with said incoming trunk, means effective responsive to the association of said key set with said incoming trunk for transmitting a different tone signal over said incoming trunk, manual means for connecting said incoming trunk to an idle one of said outgoing trunks, and means for maintaining the operative association of said incoming trunk and key set while said key set is being operated to transmit signals over said outgoing trunk.

HERMAN E. NOWECK.
THEODORE D. ROBB.

REFERENCES CITED

The following references are of record in the file of this patent:

UNITED STATES PATENTS

| Number | Name | Date |
|---|---|---|
| 1,795,813 | Whitney | Mar. 10, 1931 |
| 1,916,760 | Henry | July 4, 1933 |
| 2,259,100 | Dahl | Oct. 14, 1941 |
| 2,332,885 | Bakker | Oct. 26, 1943 |